United States Patent
Nakao et al.

(10) Patent No.: US 7,079,593 B2
(45) Date of Patent: Jul. 18, 2006

(54) RECEIVING METHOD AND RECEIVING APPARATUS

(75) Inventors: Seigo Nakao, Gifu (JP); Nobuo Higashida, Moriguchi (JP)

(73) Assignees: Sanyo Electric Co., LTD, Osaka (JP); NTT Data Sanyo System Corporation, Osaka (JP)

( * ) Notice: Subject to any disclaimer, the term of this patent is extended or adjusted under 35 U.S.C. 154(b) by 0 days.

(21) Appl. No.: 10/948,746

(22) Filed: Sep. 24, 2004

(65) Prior Publication Data

US 2005/0101276 A1    May 12, 2005

(30) Foreign Application Priority Data

Sep. 26, 2003    (JP)    ............................. 2003-335603

(51) Int. Cl.
*H04L 27/06*    (2006.01)
(52) U.S. Cl. ...................... 375/316; 375/147; 375/324; 455/137
(58) Field of Classification Search ................ 375/316, 375/147, 324, 347, 267; 455/132, 133, 137
See application file for complete search history.

(56) References Cited

U.S. PATENT DOCUMENTS

2002/0187814 A1* 12/2002 Yoshida ..................... 455/562
2005/0053123 A1* 3/2005 Higuchi et al. ............. 375/148

FOREIGN PATENT DOCUMENTS

JP    2001-285161 A    10/2001

* cited by examiner

*Primary Examiner*—Temesghen Ghebretinsae
(74) *Attorney, Agent, or Firm*—McDermott Will & Emery LLP

(57) ABSTRACT

A measuring unit selects as a representative signal a signal whose received power is the largest among digital received signals in a training signal period, and regards the remaining signals as signals to be processed. Based on a representative notifying signal, a classification unit rearranges the orders of digital received signals after the end of a training signal period. In a synthesizing unit, a multiplier weights the digital received signals with receiving weight vector signals so as to generate multiplication signals which will be summed up in an adder. A receiving weight vector signal computing unit computes receiving weight vector signals by using an adaptive algorithm, over the training signal period of time. After the end of a training signal period, the receiving weight vector signals are updated based on the multiplication signals.

18 Claims, 12 Drawing Sheets

RECEIVING METHOD AND RECEIVING APPARATUS

BACKGROUND OF THE INVENTION

1. Field of the Invention

The present invention relates to receiving technologies and it particularly relates to a receiving method for receiving signals by a plurality for antennas and a receiving apparatus.

2. Description of the Related Art

In wireless communication, it is generally desired that the limited frequency resources be used effectively. Adaptive array antenna technology is one of the technologies that can realize effective utilization of frequency resources. In adaptive array antenna technology, the amplitude and phase of signals transmitted and received by a plurality of antennas, respectively, are so controlled as to form a directional pattern of the antenna. In other words, the apparatuses provided with adaptive array antennas change the amplitude and phase of signals received by a plurality of antennas, respectively, add up the thus changed received signals, and receive the signals equivalent to the signals received by the antenna having the directional pattern corresponding to the variation in the said amplitude and phase (hereinafter referred to as "weight"). In addition, signals are transmitted in a directional pattern of the antenna corresponding to the weight.

One example of processings for weight computation in adaptive array antenna technology is a processing based on the MMSE (Minimum Mean Square Error) method. In the MMSE method, the Wiener solution is known to be the condition for an optimum weight value. Also known is a recurrence formula with smaller amounts of calculation than directly solving for the Wiener solution. For such recurrence formulas, adaptive algorithms, such as RLS (Recursive Least Squares) algorithm and LMS (Least Mean Squares) algorithm, are used.

Also where adaptive array antennas are not used, there exist phase errors, which are normally called frequency offset, in the signals generated by a local oscillator in a transmitting apparatus as well as in the signals generated by a local oscillator in a receiving apparatus. For example, when a phase modulation, such as QPSK (Quadrature Phase Shift Keying), is used for modulation between a transmitting apparatus and a receiving apparatus, the QPSK signal points on the constellation of the signals received by the receiving apparatus rotate due to phase errors. Since the rotation of signal points like this lowers signal transmission quality, an automatic frequency controller (AFC) is normally provided in a receiving apparatus to prevent it (see, for example, Reference (1) in the following Related Art List).

RELATED ART LIST (1) Japanese Patent Application Laid-Open No. 2001-285161.

In an adaptive algorithm, for instance, the weights are generally calculated within a known reference signal period and the data signals following the reference signals are weighted for synthesis. However, when a plurality of local oscillators are respectively provided for a plurality of antennas, which constitute an adaptive array, a synthesis can be performed within the reference signal period for signals received by a plurality of antennas and to be synthesized, but a synthesis cannot necessarily be performed within the data signal period. Particularly when the plurality of local oscillators used display low frequency stability, phase errors among the plurality of signals will increase with the passage of time. As a result, there may be cases where a plurality of signals, for which a synthesis can be performed within the reference signal period, cannot be subjected to a synthesis at the end of data signals. This can be prevented by adaptively updating the weights even after the reference signal period. Yet, this method of adaptively updating the weights tends to increase the amount of calculation, thus resulting in a larger scale of circuit and a higher circuit cost.

SUMMARY OF THE INVENTION

The present invention has been made in view of the foregoing circumstances and an object thereof is to provide a receiving technology capable of correcting frequency errors that may occur among signals received by a plurality of antennas.

A preferred embodiment according to the present invention relates to a receiving apparatus. This apparatus comprises: a receiver which respectively receives a plurality of signals that contain known signals continuously within a predetermined period, via a plurality of antennas; a signal generator which respectively generates a plurality of phase rotation signals for synchronizing the phase of the plurality of signals received by the receiver, at least over the period that contains known signals; a phase rotation unit which rotates the phase of the plurality of received signals by the plurality of phase rotation signals generated by the signal generator; a classification unit which selects one of the plurality of signals which are phase-rotated by the phase rotation unit as a representative signal and which classifies the remaining phase rotated signals as signals to be processed; an error detector which respectively detects errors in phase components of the signals to be processed relative to a phase component of the representative signal, after the end of the period that contains the known signals; and an update unit which respectively updates the phase rotated signals corresponding to the signals to be processed, based on the errors in phase components detected by the error detector.

By employing the above apparatus, even after the end of a period that contains known signals the phase components of the signals to be processed are synchronized with the phase component of the representative signal, so that the deviation of phase components can be corrected.

Another preferred embodiment according to the present invention relates also to a receiving apparatus. This apparatus comprises: a receiver which respectively receives a plurality of signals that contain known signals continuously within a predetermined period, via a plurality of antennas; a classification unit which selects one of the plurality of signals received by the receiver as a representative signal and which classifies the remaining signals received by the receiver as signals to be processed; an initial detector which respectively detects errors in phase components of the signals to be processed relative to a phase component of the representative signal, as initial phase errors, within the period containing known signals; an error detector which respectively detects errors in phase components of the signals to be processed relative to a phase component of the representative signal, after the end of the period containing known signals, and which removes corresponding initial phase errors from the errors in phase components; a first phase rotation unit which respectively rotates the phase of the plurality of the signals to be processed by errors in phase component from which the initial phase error has been removed; a signal generator which respectively generates a plurality of phase rotation signals for synchronizing the phase of the plurality of signals received by the receiver, at least over the period that contains known signals; and a second phase rotation unit which respectively rotates the phase of a plurality of signals that contain the representative signal and the phase-rotated signals to be processed, by the plurality of phase rotation signal generated by the signal generator.

By employing the above apparatus, even after the end of a period that contains known signals the phase components of the signals to be processed are rotated in a manner such that errors between the signals to be processed and the representative signal are retained, so that a deviation caused in the phase components after the end of a period that contains known signals can be corrected.

The apparatus may further comprise a synthesizing unit which synthesizes the plurality of signals which are phase-rotated by the phase rotation unit.

The "synthesizing" may be such that only the phase of a plurality of signals are synthesized or both the phase and amplitude of a plurality of signals are synthesize.

Still another preferred embodiment according to the present invention relates also to a receiving apparatus. This apparatus comprises: a receiver which respectively receives a plurality of signals that contain known signals continuously within a predetermined period, via a plurality of antennas; a derivation unit which derives a plurality of receiving weight factors for the plurality of signal received by the receiver at least over the period that contains known signals; a synthesizing unit which multiplies the plurality of derived receiving weight factors by the plurality of signals received by the receiver and which synthesizes a plurality of multiplication results; a classification unit which selects one of the plurality of multiplication results as a representative signal and which classifies the remaining multiplication results as signals to be processed; an initial detector which respectively detects errors in phase components of the signals to be processed relative to a phase component of the representative signal, as initial phase errors, within the period that contain known signals; an error detector which respectively detects errors in phase components of the signals to be processed relative to a phase component of the representative signal, after the end of the period that contains the known signals and which removes corresponding initial phase errors from the errors in phase components; and an update unit which respectively updates the receiving weight factors corresponding to the signals to be processed, by the errors in phase components from which the initial phase error has been removed.

By employing the above apparatus, the receiving weight factors after the end of the period that contains known signals are controlled in a manner such that errors of a plurality of signals at the end of a period that contains known signals are retained. Thus, even if there is no known signals a phase relation in signals prior to the synthesizing can be kept intact in the similar manner as in the period that contains known signals.

The receiver may receive the plurality of signals, based on a plurality of local signals outputted respectively from a plurality of signal generators. The apparatus may further comprise a measuring unit which measures the strength of the plurality of signals received by the receiver, wherein according to the measured strength of the plurality of signals the classification unit may select one of the plurality of multiplication results as a representative signal.

An example of "receive respectively the plurality of signals" is quadrature detection. However, the plurality of signals may be received by other methods as well.

Still another preferred embodiment according to the present invention relates to a receiving method. This method comprises: receiving respectively a plurality of signals that contain known signals continuously within a predetermined period and generating respectively a plurality of phase rotation signals for synchronizing the phase of the plurality of received signals, at least over the period that contains known signals; rotating the phase of the plurality of received signals by the plurality of phase rotation signals generated by the generating, and selecting one of the plurality of signals which are phase-rotated by the rotating as a representative signal and regarding the remaining phase rotated signals as signals to be processed; and updating respectively the phase rotated signals corresponding to the signals to be processed, based on the errors in phase components of the signals to be processed relative to a phase component of the selected representative signal, after the end of the period containing known signals.

The method may further comprise synthesizing results on the plurality of phase rotated signals so as to output synthesized signals.

Still another preferred embodiment according to the present invention relates also to a receiving method. This method comprises: receiving respectively a plurality of signals that contain known signals continuously within a predetermined period and deriving a plurality of receiving weight factors for the plurality of received signal at least over the period that contains known signals; multiplying the plurality of derived receiving weight factors by the plurality of received signals, and selecting one of the plurality of multiplication results as a representative signal and regarding the remaining multiplication results as signals to be processed; detecting respectively errors in phase components of the signals to be processed relative to a phase component of the representative signal, as initial phase errors, within the period that contains known signals; and updating respectively the receiving weight factors corresponding to the signals to be processed, by signals from which the initial phase errors are respectively removed from the detected errors in phase components of the signals to be processed relative to a phase component of the representative signal, after the end of the period that contains known signals.

The deriving a plurality of receiving weight factors may be such that the plurality of signals are received respectively based on a plurality of local signals outputted respectively from a plurality of signal generators. The method may further comprise measuring the strength of the plurality of received signals, wherein the selecting a representative signal may select one of the plurality of multiplication results as a representative signal according to the measured strength of the plurality of received signals.

Still another preferred embodiment according to the present invention relates to a program executable by a computer. This program includes the functions of: receiving respectively a plurality of signals that contain known signals continuously within a predetermined period, via a plurality of antennas; generating respectively a plurality of phase rotation signals for synchronizing the phase of the plurality of received signals, at least over the period that contains known signals and storing the thus generated plurality of phase rotation signals in a memory; rotating the phase of the plurality of received signals by the plurality of phase rotation signals generated by the generating; selecting one of the plurality of signals which are phase-rotated by rotating as a representative signal and regarding the remaining phase rotated signals as signals to be processed; detecting respectively errors in phase components of the signals to be processed relative to a phase component of the representative signal, after the end of the period containing the known signals; and updating respectively on the memory the phase rotated signals corresponding to the signals to be processed, based on the detected errors in phase components.

The functions thereof may further comprise synthesizing the plurality of phase rotated signals so as to output synthesized signals.

Still another preferred embodiment according to the present invention relates also to a program executable by a computer. This program includes the functions of: receiving respectively a plurality of signals that contain known signals continuously within a predetermined period, via a plurality of antennas; deriving a plurality of receiving weight factors for the plurality of received signal at least over the period that contains known signals, and storing the thus derived plurality of receiving weight factors in a memory; multiplying the plurality of receiving weight factors stored in the memory by the plurality of received signals and synthesizing a plurality of multiplication results; selecting one of the plurality of multiplication results as a representative signal and regarding the remaining multiplication results as signals to be processed; detecting respectively errors in phase components of the signals to be processed relative to a phase component of the representative signal, as initial phase errors, within the period that contains known signals; detecting respectively errors in phase components of the signals to be processed relative to a phase component of the representative signal, after the end of the period that contains the known signals, and removing corresponding initial phase errors from the errors in phase components; and updating respectively on the memory the receiving weight factors corresponding to the signals to be processed, by the errors in phase components from which the initial phase errors have been removed.

The receiving may be such that the plurality of signals are received respectively based on a plurality of local signals outputted respectively from a plurality of signal generators. The functions thereof may further comprise measuring the strength of the plurality of received signals, wherein the selecting a representative signal may select one of the plurality of multiplication results as a representative signal according to the measured strength of the plurality of received signals.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
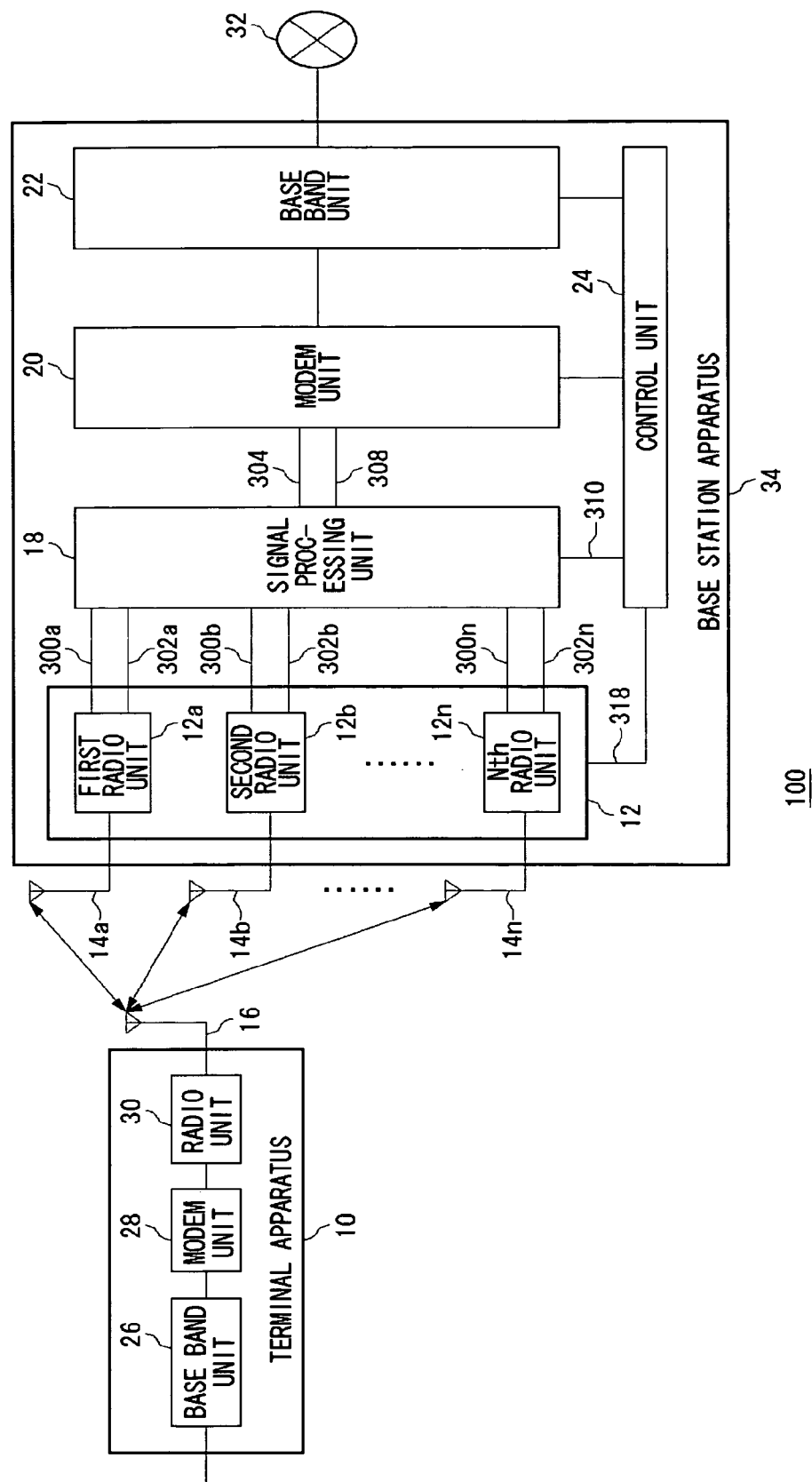
FIG. 1 shows a structure of a communication system according to a first embodiment of the present invention.

Before describing specific modes of invention, a general description of the present invention will be given hereinbelow. A first embodiment according to the present invention relates to base station apparatus, to which terminal apparatuses can be connected, such as base station apparatus used in the wireless LAN (Local Area Network). A base station apparatus according to the present embodiments is provided with a plurality of antennas, and performs quadrature detection on signals received via the plurality of antennas from an intended terminal apparatus by a plurality of frequency oscillators corresponding to the respective signals. The base station apparatus then computes from the plurality of quadrature-detected signals a plurality of weighting factors (hereinafter referred to as "receiving weight vectors") that respectively correspond to the quadrature-detected signals, and performs an adaptive array signal processing on the plurality of signals from the terminal apparatus. The signals from the terminal apparatus are received in a burst-like manner. And a known signal is placed in a header portion of a burst signal, and a data signal is placed subsequent to the known signal. The base station apparatus calculates receiving weight vectors in a period during which the received signals contain the known signals. The plurality of frequency oscillators do not have high stability of frequency and each frequency is deviated from one another, so that phase errors are caused among a plurality of received signals within a data signal period.

The base station apparatus according to the present embodiments selects a digital received signal 300 with the largest received power (hereinafter referred to as a "representative signal") from among a plurality of received signals received by a plurality of antennas, and the signals other than the representative signal signal are regarded as the signals to be processed. At the end of a known signal period, the errors between the phase of receiving weight vectors corresponding to the representative signal (hereinafter referred to as "representative receiving weight vector") and the phases of receiving weight vectors corresponding to signals to be processed (hereinafter referred to as "receiving weight vectors to be processed") are computed in units of the signals to be processed, and the thus computed errors are called initial phase errors. Within a data signal period, the phase errors between a multiplication result of the representative signal and the representative receiving weight vector (this multiplication result being also called the "representative signal" which will be used with no distinction from the above-mentioned representative signal) and multiplication results of the signals to be processed and the receiving weight vectors to be processed (these multiplication results being also called the "signals to be processed" which will be used with no distinction from the above-mentioned signals to be processed) are computed. Then, the phase of receiving weight vector to be processed is corrected by a signal where the initial phase error is removed from the phase error. That is, even after the end of the signal period, too, the phase relation between the representative receiving weight vector and the receiving weight vectors to be processed are controlled in such a manner that the phase relation thereof is identical to that at the end of the signal period.

The invention will now be described based on the following embodiments which do not intend to limit the scope of the present invention but exemplify the invention. All of the features and the combinations thereof described in the embodiments are not necessarily essential to the invention.

First Embodiment

FIG. 1 shows a structure of a communication system 100 according to a first embodiment of the present invention. The communication system 100 includes a terminal apparatus 10, a base station apparatus 34 and a network 32. The terminal apparatus 10 includes a baseband unit 26, a modem unit 28, a radio unit 30 and an antenna 16 for use with terminal apparatus. The base station apparatus 34 includes a first basestation antenna 14a, a second basestation antenna 14b, . . . and an Nth basestation antenna 14n, which are generically referred to as basestation antennas 14, a first radio unit 12a, a second radio unit 12b, . . . and an Nth radio unit 12n, which are generically referred to as a radio unit 18, a signal processing unit 18, a modem unit 20, a baseband unit 22 and a control unit 24. Moreover, the base station apparatus 34 includes, as signals, a first digital received signal 300a, a second digital received signal 300b, . . . and an Nth digital received signal 300n, which are generically referred to as digital received signals 300, a first digital transmission signal 302a, a second digital transmission signal 302b, . . . and an Nth digital transmission signal 302n, which are generically referred to as digital transmission signals 302, a composite signal 304, a pre-separation signal 308, a signal processor control signal 310 and a radio unit control signal 318.

The baseband unit 22 in the base station apparatus 34 is an interface with the network 32 whereas the baseband unit 26 in the terminal apparatus 16 is an interface with a PC connected to a terminal apparatus 10 or applications inside the terminal apparatus 10. The baseband unit 22 and the baseband unit 26 perform respectively transmission/receiving processings on information signals to be transmitted in the communication system 100. Error correction or automatic retransmission processing may also be carried out, but the description of such processings is omitted here.

The modem unit 20 in the base station apparatus 34 and the modem unit 28 in the terminal apparatus 10 carry out a modulation processing in which transmission signals are generated by modulating carriers with information signals to be transmitted. In the present embodiment, assumed as modulation method are BPSK (Binary Phase Shift Keying) and QPSK (Quaternary Phase Shift Keying). The modem units 20 and 28 also carry out a demodulation processing in which the transmitted information signals are reproduced by demodulating the received signals.

The signal processing unit 18 performs a signal processing necessary for a transmission/receiving processing of adaptive array antennas.

The radio unit 12 in the base station apparatus 34 and the radio unit 30 in the terminal apparatus 10 carry out frequency conversion processing, amplification processing, A-D or D-A conversion processing and the like between the baseband signals and radio frequency signals, which are processed by the signal processing unit 18, the modem unit 20, the baseband unit 22, the baseband unit 26 and the modem unit 28. Though the details will be described later, assumed herein is that a plurality of frequency oscillators for use with quadrature detection and quadrature modulation corresponding to the basestation antennas described later are included in the radio unit 12.

The basestation antennas 14 in the base station 34 and the terminal antenna 16 in the terminal apparatus 10 perform transmission/receiving processings for signals of radio frequencies. The directivity of the antennas may be arbitrary and the number of basestation antennas 14 is denoted by N.

The control unit 24 controls timings or channel allocation for the radio unit 12, the signal processing unit 18, the modem unit 20 and the baseband unit 22.

Figure 2:
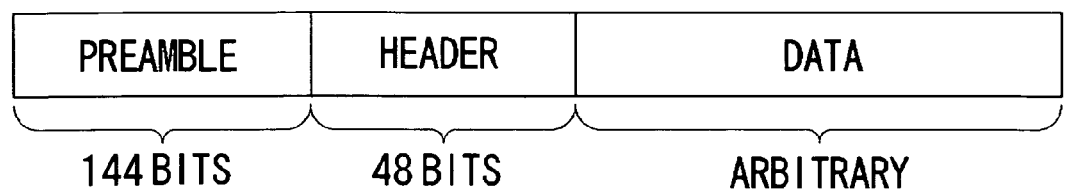
FIG. 2 shows a burst format according to the first embodiment.

FIG. 2 shows a burst format according to the first embodiment. This format is a burst format used in IEEE802.11b, which is one of standards for CSMA (Carrier Sense Multiple Access)-based wireless LAN (Local Area Network). A preamble is placed in the first 144 bits of the burst, and a header is placed in the subsequent 48 bits thereof. The preamble, which is known to the terminal apparatus 10 or the base station apparatus 34, can also be used as a training signal which will be described later.

Figure 3:
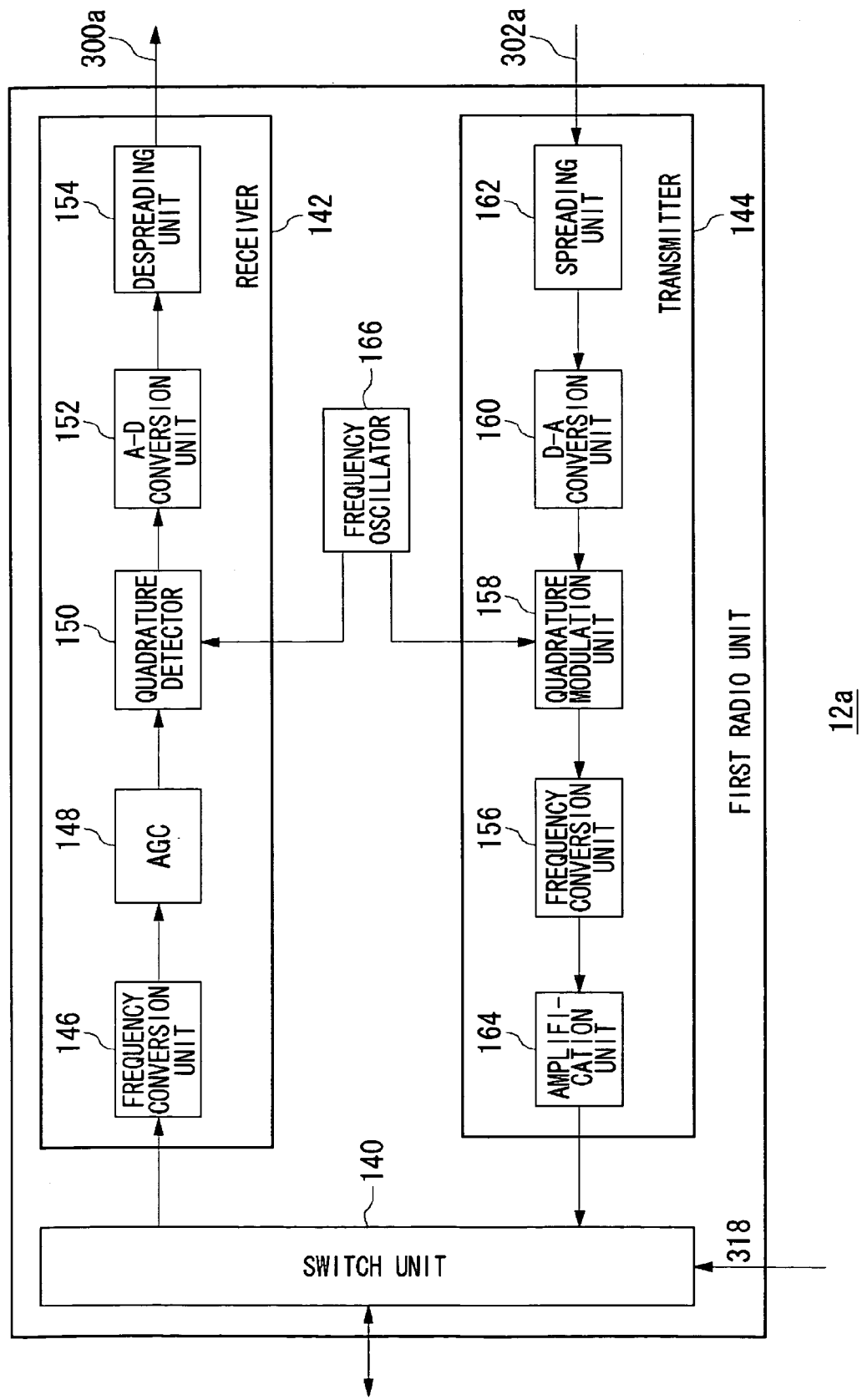
FIG. 3 shows a structure of a first radio unit shown in FIG. 1.

FIG. 3 shows a structure of a first radio unit 12a. The first radio unit 12a includes a switch unit 140, a receiver 142, a transmitter 144 and a frequency oscillator 166. The receiver 142 includes a frequency conversion unit 146, an AGC (Automatic Gain Control) 148, a quadrature detector 150, an A-D conversion unit 152 and an despreading unit 154. The transmitter 144 includes an amplification unit 164, a frequency conversion unit 156, a quadrature modulation unit 158, a D-A conversion unit 160 and a spreading unit 162.

The switch unit 140 switches input and output of signals to the receiver 142 and the transmitter 144 according to radio control signals 318 from the control unit 24 (not shown in FIG. 3). That is, the switch unit 140 selects the signals from the transmitter 144 at the time of transmission whereas it selects the signals to the receiver 142 at the time of receiving.

The frequency conversion unit 146 in the receiver 142 and the frequency conversion unit 156 in the transmitter 144 perform frequency conversion on targeted signals between radio frequencies and intermediate frequencies.

The AGC 148 controls gain automatically to make the amplitude of the received signals an amplitude within the dynamic range of the A-D conversion unit 152.

The quadrature detector 150 generates baseband analog signals by performing quadrature detection on intermediate frequency signals. On the other hand, the quadrature modulation unit 158 generates intermediate frequency signals by performing quadrature modulation on the baseband analog signals.

The frequency oscillator 166 supplies to the quadrature detector 150 and the quadrature modulation unit 158 a signal having a predetermined frequency. As shown in FIG. 1 and FIG. 3, a single radio unit 12 is provided with a single frequency oscillator 166, so that a plurality of radio units 12 are respectively provided with a plurality of frequency oscillators 166.

The A-D conversion unit 152 converts baseband analog signals into digital signals, and the D-A conversion unit 160 converts baseband digital signals into analog signals.

The despreading unit 154 performs an despread processing on baseband digital signals by a spread code sequence. Here, the despread-processed baseband digital signal which is outputted from the despreading unit 154 is called a first digital received signal 300a. It is to be noted that this despread processing may be replaced by a Walsh transform and in such case the base station apparatus 34 can be communicated by CCK (Complementary Code Keying) modulation.

The spreading unit 162 performs a spread processing on baseband digital signals by a spread code sequence. Here, a baseband digital signal, which will be subjected to the spread processing and is inputted to the spreading unit 162, is called a first digital transmission signal 302a.

The amplification unit 164 amplifies radio frequency signals to be transmitted.

Figure 4:
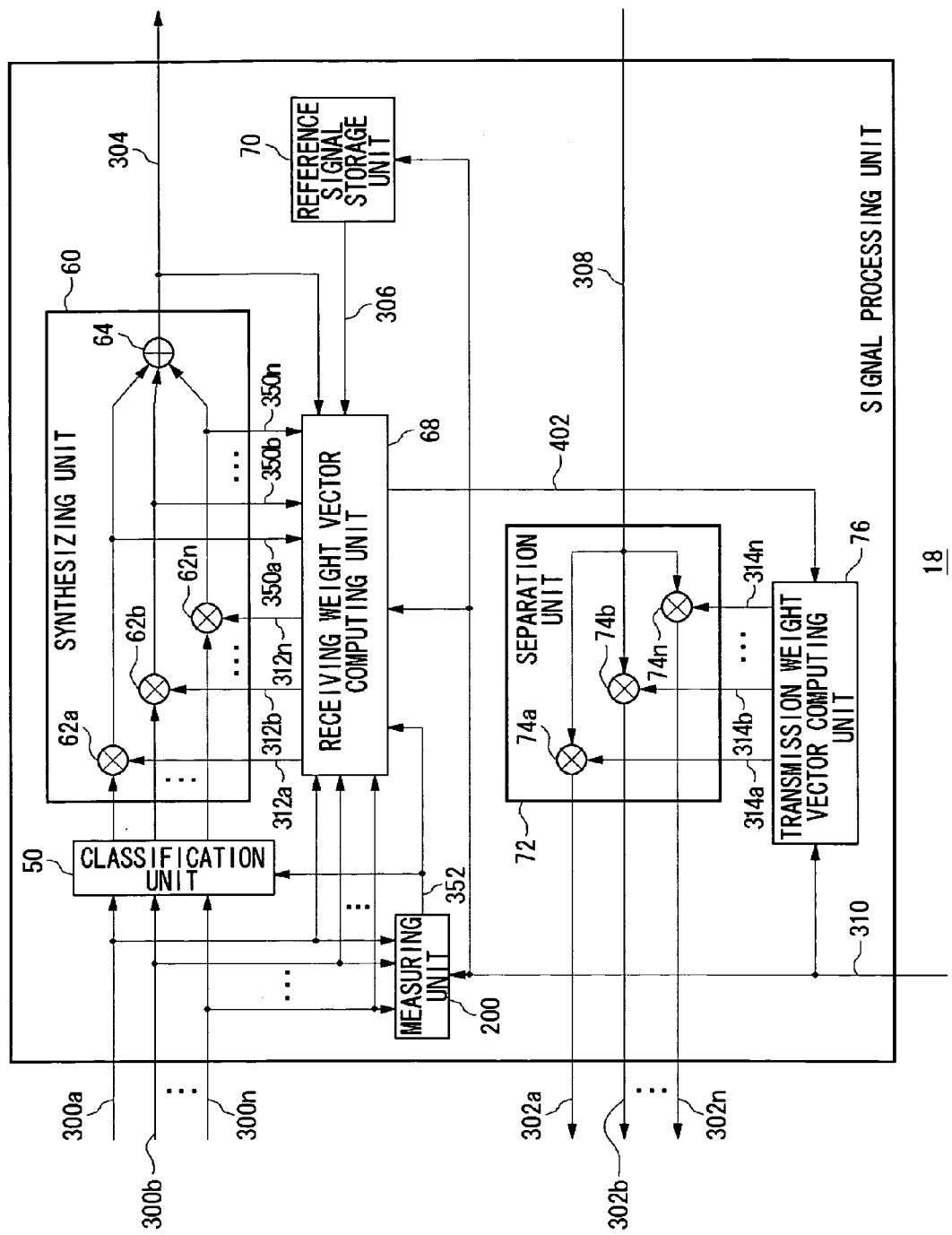
FIG. 4 shows a structure of a signal processing unit shown in FIG. 1.

FIG. 4 shows a structure of a signal processing unit 18. The signal processing unit 18 includes a classification unit 50, a synthesizing unit 60, a receiving weight vector computing unit 68, a reference signal storage unit 70, a measuring unit 200, a separation unit 72 and a transmission weight vector computing unit 76. The synthesizing unit 60 includes a first multiplier 62a, a second multiplier 62b, . . . and an Nth multiplier 62n, which are generically named multipliers 62, and an adder 64. The separation unit 72 includes a multiplier 74a, a second multiplier 74b, . . . and an Nth multiplier 74n, which are generically named multipliers 74.

Referring to FIG. 4, signals involved in the signal processing unit 18 include a reference signal 306, an output receiving weight vector signal 402, a first receiving weight vector signal 312a, a second receiving weight vector signal 312b, . . . and an Nth receiving weight vector signal 312n, which are generically referred to as receiving weight vector signals 312, a first transmission weight vector signal 314a, a second transmission weight vector signal 314b, . . . and an Nth transmission weight vector signal 314n, which are generically referred to as transmission weight vector signals 314, a first multiplication signal 350a, a second multiplication signal 350b, . . . and an Nth multiplication signal 350n, which are generically referred to as multiplication signals 350 and a representative notifying signal 352.

The measuring unit 200 measures respectively the received powers of digital received signals 300 in a training signal period and selects as the representative signal one of received signals 300 having the largest received power and, as described above, determines digital received signals 300 other than the representative signal to be signals to be processed. Information on the thus selected representative signal is outputted as a representative notifying signal 352. Here, the recognition of a training signal period is done by a signal processor control signal 310.

The classification unit 50 changes the order of digital received signals 300 based on the representative notifying signal 352 after the end of a training signal period. Specifically, the representative signal is inputted to a first multiplier 62a of multipliers 62 described later. During a training signal period, on the other hand, it is not necessary that the order of inputted digital received signals 300 be changed, or the order of the digital received signals 300 may be changed according to the representative notifying signal 352 at the previous burst signal.

The synthesizing unit 60 generates multiplication signals 350 by weighting digital received signals 300 with receiving weight vector signals 312 in the multipliers 62 and then adds the thus generated multiplication signals 350 in the adder 64 to output a composite signal 304.

The reference signal storage unit 70 outputs as a reference signal 306 the known signal training signal stored beforehand during a training signal period.

Over a training signal period of time the receiving weight vector computing unit 68 computes receiving weight vector signals 312 necessary for weighting the digital received signals 300 from the digital received signals 300, the composite signal 304 and the reference signal 306, using an adaptive algorithm, such as RLS (Recursive Least Squares) algorithm or LMS (Least Mean Squares) algorithm. After the end of a training signal period, the receiving weight vector computing unit 68 updates the receiving weight vector signals 312 based on the multiplication signals 350. Methods for updating them will be described later.

The transmission weight vector computing unit 76 sets transmission weight vector signals 314 necessary for weighting a pre-separation signal 308, based on an output receiving weight vector signal 402. For the sake of brevity, the receiving weight vector signal 312 and the transmission weight vector signal 314 may be identical.

The separation unit 72 weights a separation signal 308 with a transmission weight vector signal 314 in the multipliers 74, and outputs digital transmission signals 302.

In terms of hardware, the above-described structure can be realized by a CPU, a memory and other LSIs of an arbitrary computer. In terms of software, it is realized by memory-loaded programs, but drawn and described herein are function blocks that are realized in cooperation with those. Thus, it is understood by those skilled in the art that these function blocks can be realized in a variety of forms by hardware only, software only or the combination thereof.

Figure 5:
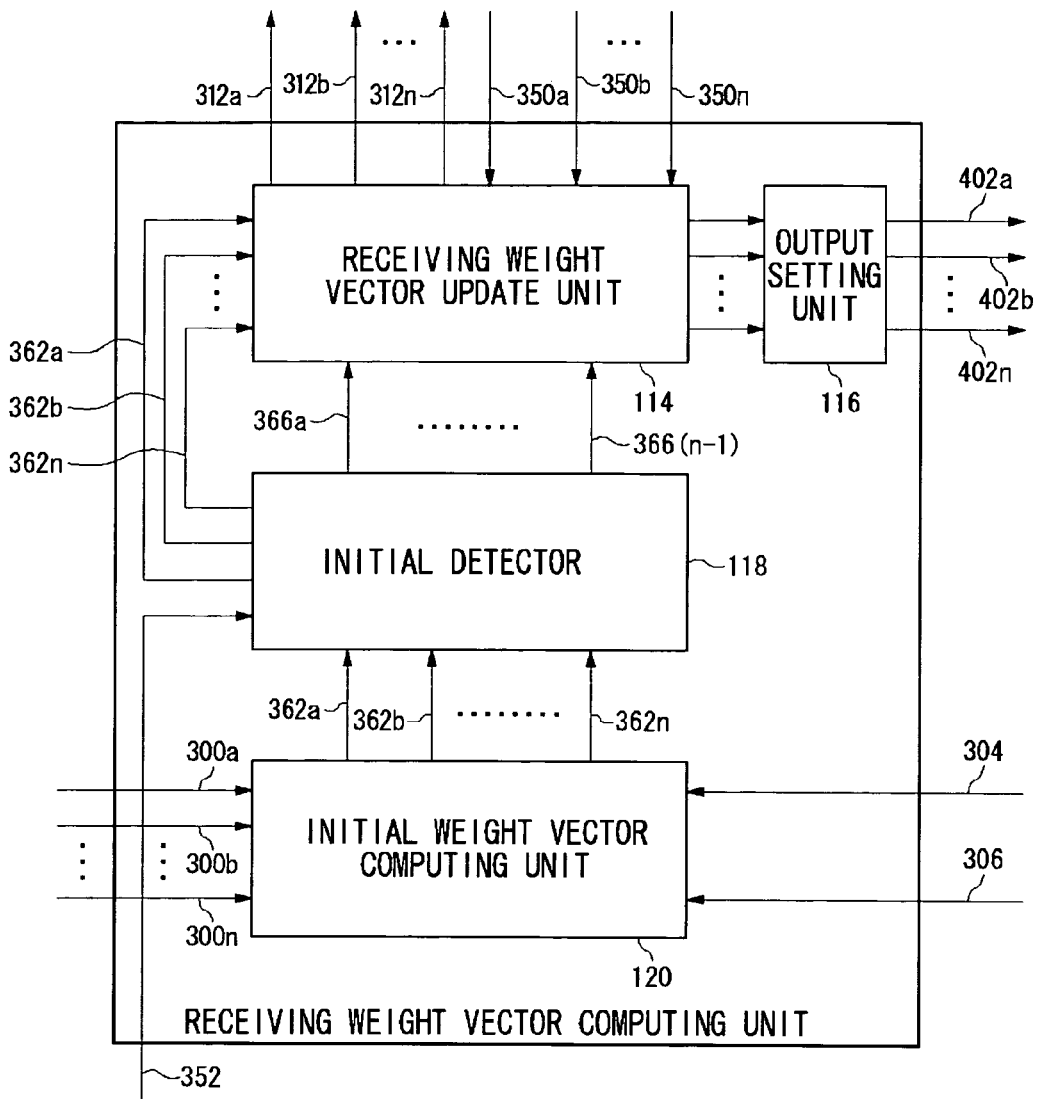
FIG. 5 shows a structure of a receiving weight vector computing unit shown in FIG. 4.

FIG. 5 shows a structure of a receiving weight vector computing unit 68. The receiving weight vector computing unit 68 includes a receiving weight vector update unit 114, an output setting unit 116, an initial detector 118 and an initial weight vector computing unit 120. Signals involved therein include a first initial weight vector signal 362a, a second initial weight vector signal 362b, . . . and an Nth initial weight vector signal 362n, which are generically referred to as initial weight vector signals 362, a first initial phase error signal 366a, . . . and an (N-1) th initial phase error signal 366(n-1), which are generically referred to as initial phase error signals 366, and a first output receiving weight vector signal 402a, a second output receiving weight vector signal 402b, . . . and an Nth output receiving weight vector signal 402n, which are generically referred to as output receiving weight vector signals 402.

During a training signal period the initial weight vector computing unit 120 computes initial weight vector signals 362 from the digital received signals 300, the composite signal 304 and the reference signal 306, by using the above-mentioned adaptive algorithm.

The initial detector 118 selects, based on the representative notifying signal 352, an initial weight vector signal 362 that corresponds to the representative signal (hereinafter referred to as "representative initial weight vector" where in contrast thereto an initial weight vector signal that corresponds to the signals to be processed will be hereinafter referred to as "initial weight vectors to be processed") from among the initial weight vector signals 362. Then the initial detector 118 outputs the representative initial weight vector to the receiving weight vector update unit 114 as the first initial weight vector signal 362a. Furthermore, the initial detector 118 calculates the phase errors of the initial weight vectors to be processed against the representative initial weight vectors at the end of a training, and outputs this phase error as an initial phase error signal 366 to the receiving weight vector update unit 114 described later. It is to be noted here that computed are as many initial phase error signals 366 as the number of the initial weight vectors to be processed.

After the end of a training signal period the receiving weight vector update unit 114 updates the receiving weight vector signals 312 wherein the initial weight vector signals 362 serve as initial values. The receiving weight vector update unit 114 updates the receiving weight vector signals 312 in a manner such that the phase errors of signals to be processed, against the representative signal, among the multiplication signals 350 are stored into the values of initial phase error signals 366.

The output setting unit 116 outputs the receiving weight vector signals 312 as output receiving weight vector signals 402. The output receiving weight vector signals 402 may be such that the receiving weight vector signals 312 are continuously outputted or such that the receiving weight vector signals 312 at a particular point like those 312 at the end of a burst signal are outputted.

Figure 6:
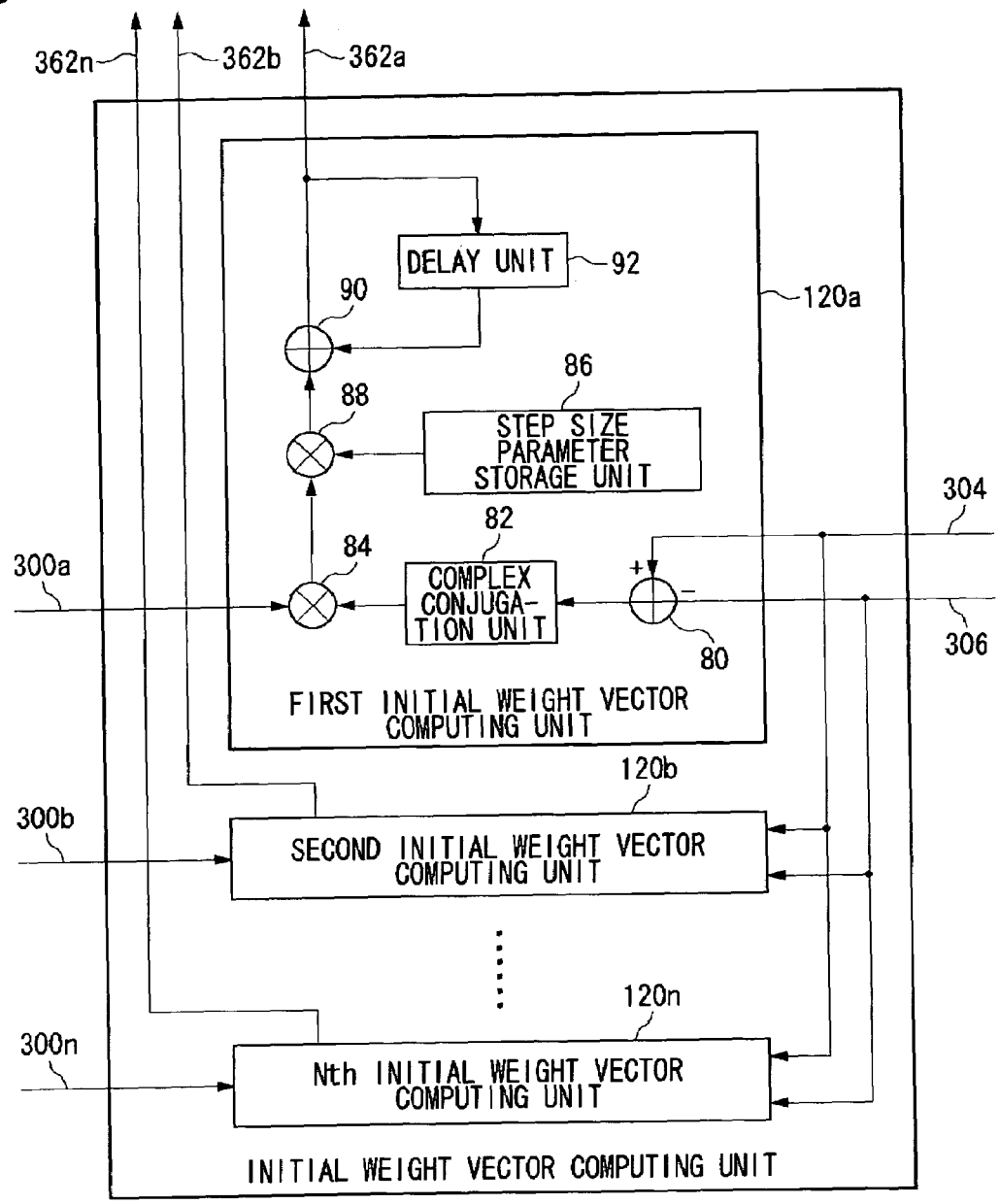
FIG. 6 shows a structure of an initial weight vector computing unit shown in FIG. 5.

FIG. 6 shows a structure of an initial weight vector computing unit 120. The initial weight vector computing unit 120 includes a first initial weight vector computing unit 120a, a second initial weight vector computing unit 120b, . . . and an Nth initial weight vector computing unit 120n. The first initial weight vector computing unit 120a includes an adder 80, a complex conjugation unit 82, a multiplier 84, a step size parameter storage unit 86, a multiplier 88, an adder 90 and a delay unit 92.

The adder 80 computes the difference between the composite signal 304 and the reference signal 306, and outputs an error signal. The error signal is subjected to a complex conjugation conversion by the complex conjugation unit 82.

The multiplier 84 multiplies the error signal after the complex conjugation conversion by the first digital received signal 300a, and generates a first multiplication result.

The multiplier 88 multiplies the first multiplication result by a step size parameter stored in the step size parameter storage unit 86, and generates a second multiplication result. The second multiplication result is subjected to a feedback by the delay unit 92 and the adder 90 and then added to a new second multiplication result. In this manner, the result of addition updated successively by the LMS algorithm is outputted as a first receiving weight vector 312a.

Figure 7:
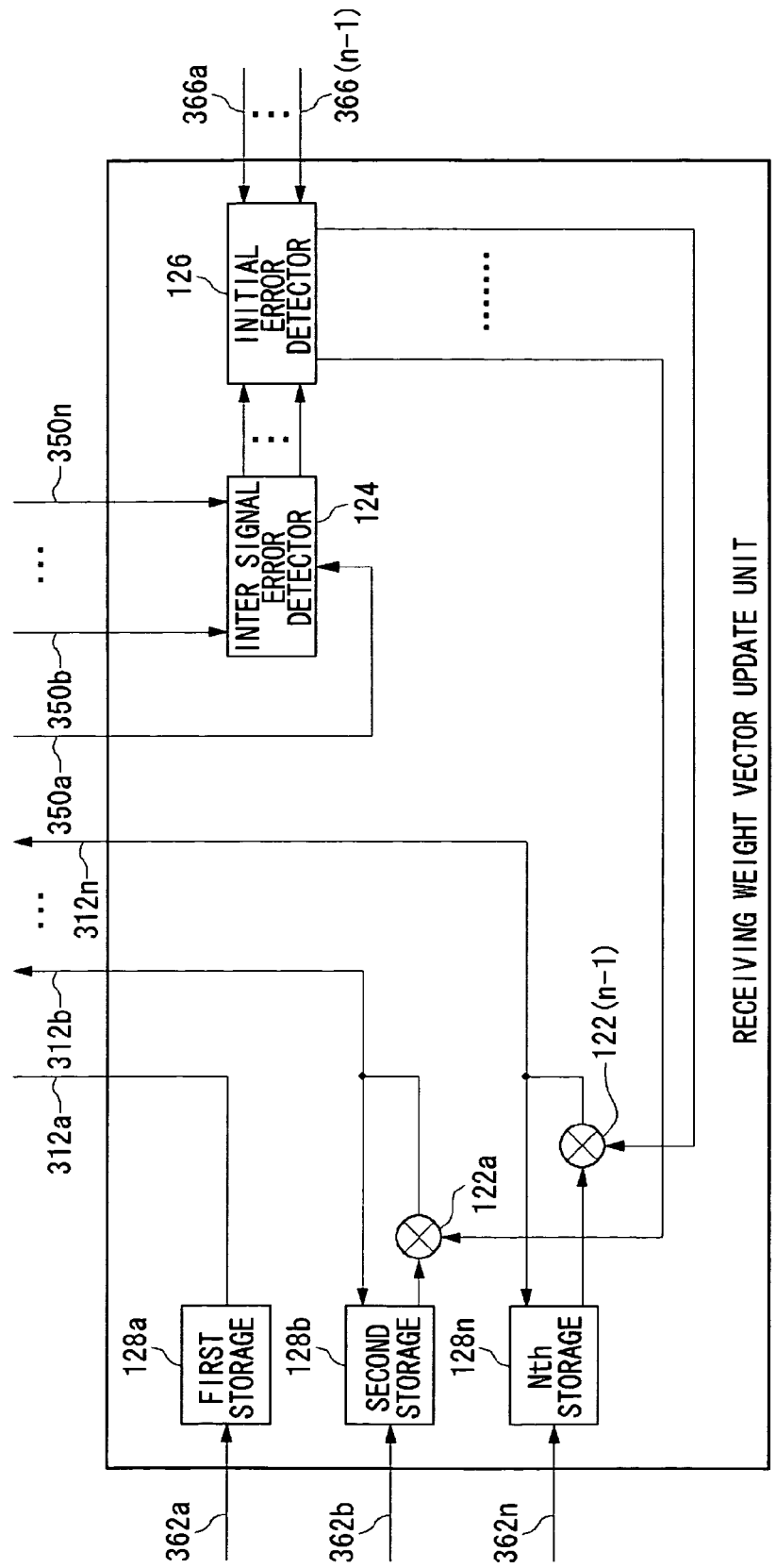
FIG. 7 shows a structure of a receiving weight vector update unit shown in FIG. 5.

FIG. 7 illustrates a receiving weight vector update unit 114. The receiving weight vector update unit 114 includes a first multiplier 122a . . . and an (N-1)th multiplier 122(n-1), which are generically referred to as multipliers 122, an inter-signal error detector 124, an initial error detector 126, and a first storage 128a, a second storage 128b . . . and an Nth storage 128n, which are generically referred to as storage 128.

The inter-signal error detector 124 calculates the phase errors of multiplication signals 350 to be processed against the representative signal. In other words, the phase errors of a second multiplication signal 350b to an Nth multiplication signal 350n in relation to a first multiplication signal 350a are calculated. The calculation of the phase errors may be carried out either by an operation of phase values or by a vector operation.

The initial error detector 126 removes values corresponding to initial phase error signals 366 respectively from the values of phase errors calculated by the inter-signal error detector 124. In other words, the deviations of initial phase error signals 366 from the respective phase values are calculated.

The multipliers 122 update past receiving weight vector signals 312 with the inverted values of phase errors outputted from the initial error detector 126 and outputs new receiving weight vector signals 312. This calculation, like that by the inter-signal error detector 124, may be carried out either by the operation of the phase values or by vector operation. It is to be noted here, however, that when the operation of the phase values is used, the values of amplitude must be stored separately.

The storage 128 holds initial weight vector signals 362 at the end of a training signal period and holds the receiving weight vector signals 312 updated by the multipliers 122 after the end of training. Here, as mentioned above, a first initial weight vector signal 362a is to be the representative initial weight vector.

Figure 8:
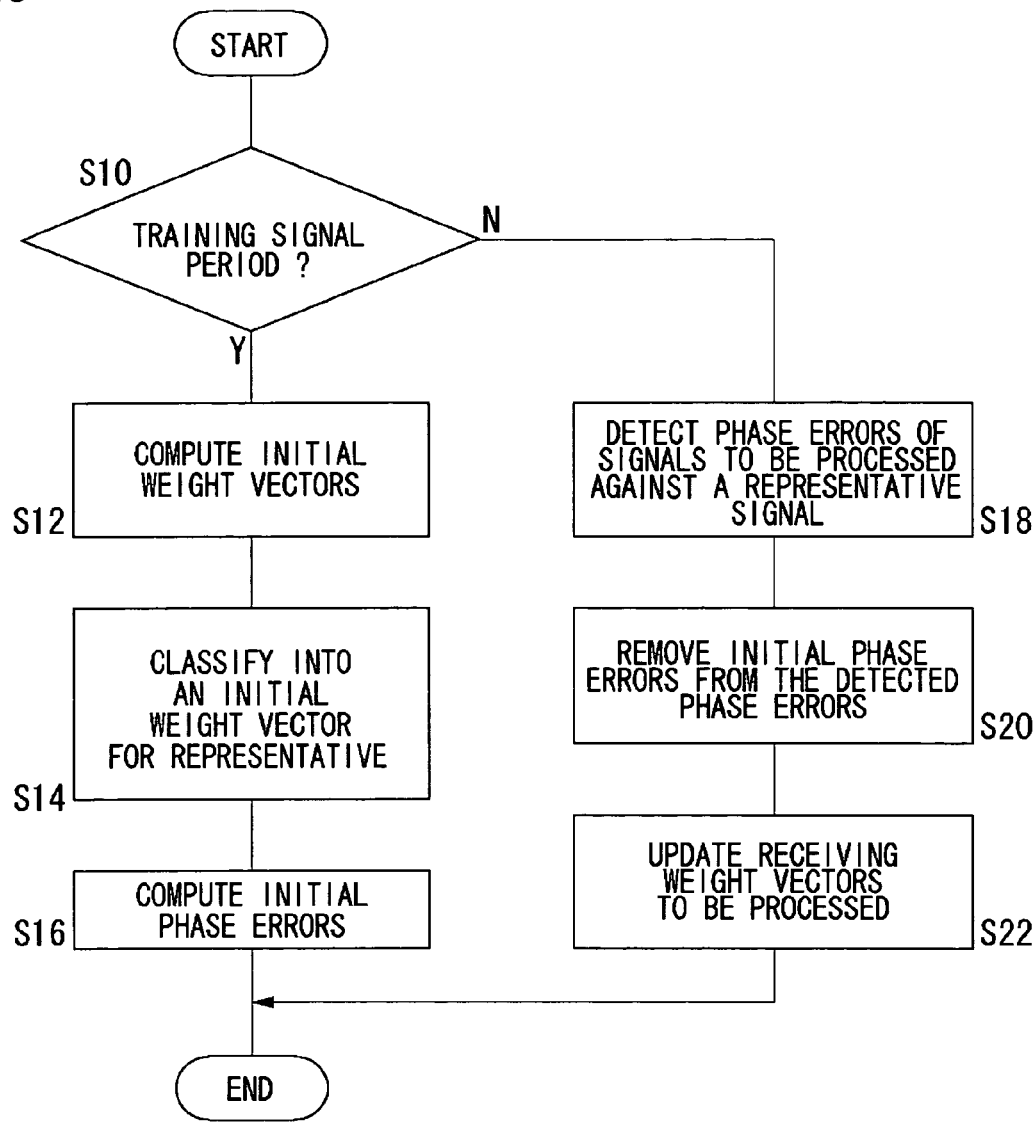
FIG. 8 is a flowchart showing an update processing procedure for weight vectors shown in FIG. 1.

FIG. 8 is a flowchart showing an update processing procedure for weight vectors. When received signals fall within a training signal period (Y of S10), the initial weight vector computing unit 120 computes initial weight vector signals 362 (S12). At the end of a training signal period, an initial detector 118 classifies the initial weight vector signals 362 into a representative weight vector and initial weight vectors to be processed based on a representative notifying signal 352 (S14). Further, the initial detector 118 computes the differences of the initial weight vectors to be processed from the representative initial weight vector as initial phase errors (S16) and outputs the initial phase error signals 366. On the other hand, when received signals do not fall within a training signal period (N of S10), the receiving weight vector update unit 114 detects phase errors of multiplication signals 350 to be processed against the representative signal (S18). Then the receiving weight vector update unit 114 removes the initial phase errors from the detected phase errors (S20). Now the receiving weight vector signals 312 are updated by the values of the phase errors with the initial phase errors removed (S22).

Figure 9:
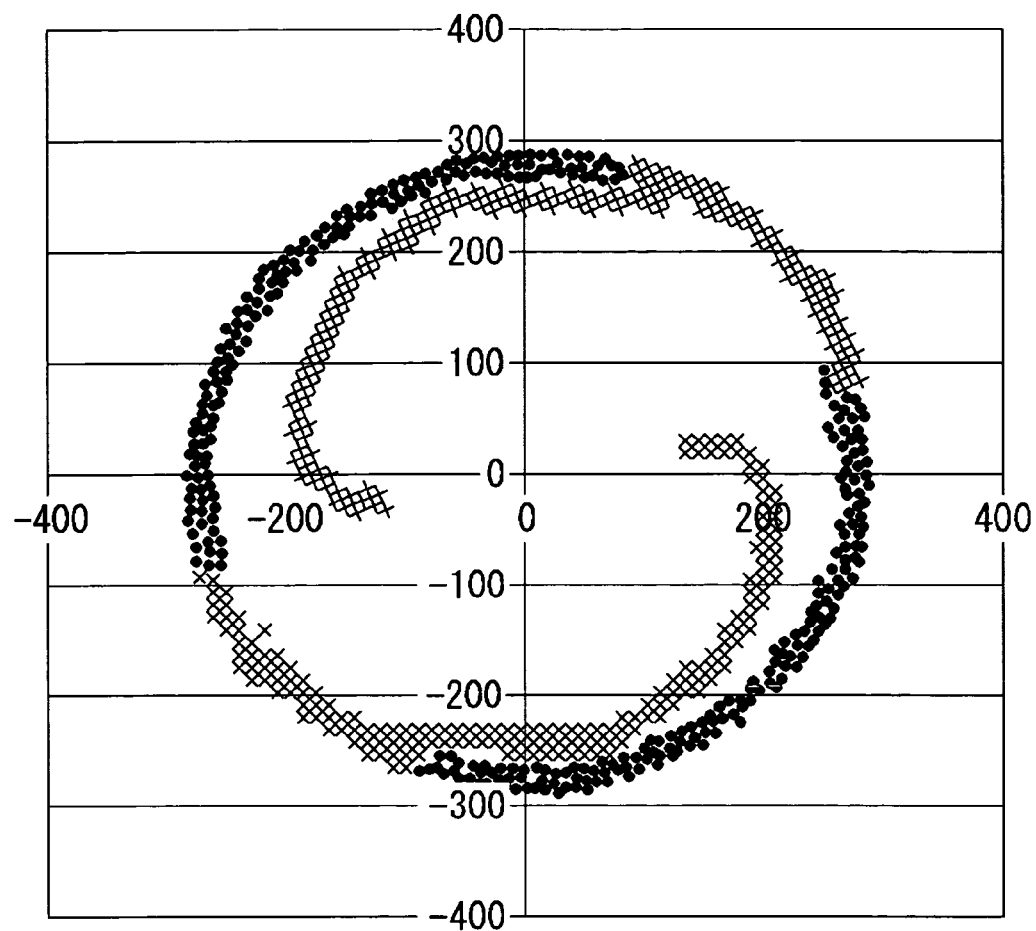
FIG. 9 illustrates output signals obtained by simulation according to a structure shown in FIG. 1.

FIG. 9 illustrates output signals obtained by simulation. As the conditions for the simulation, the number of basestation antennas 14 was four, and phase offsets of 0.948 kHz, 0.294 kHz, 0.588 kHz and 0.441 kHz were given to frequency oscillators 166 corresponding to the respective basestation antennas 14. Also, the length of a burst signal was about 1 msec. FIG. 9 shows the changes with time in the values of the in-phase component and quadrature-phase component of a composite signal 304, where the values on the x-axis and y-axis are the values quantized as digital signals. Also, the modulation technique used for signals received by the basestation antennas 14 was BPSK. The crosses (x) in FIG. 9 represent composite signals 304 for which the updating of receiving weight vector signals 312 is not done as in the present embodiment. As is shown in FIG. 9, with the passage of time, the phase relations of multiplication signals 350 begin to break down at the end of the training signal on account of the frequency offset between frequency oscillators 166, making the amplitude of composite signals 304 smaller because a plurality of multiplication signals 350 cancel out the amplitude with each other. On the other hand, the dots (•) in FIG. 9 represent composite signals 304 for which the updating of receiving weight vector signals 312 is done according to the present embodiment. A receiving weight vector computing unit 68 according to the present embodiment compensates the receiving weight vector signals 312 in such a manner as to retain the phase relations of multiplication signals 350 at the end of training, so that the amplitude of composite signals 304 does not get smaller.

An operation of a base station apparatus 34 that implements the above-described structure will be described hereinbelow. Signals received by basestation antennas 14 are subjected to quadrature detection by their respective frequency oscillators 166 which have different frequency offsets. Then the quadrature-phasely detected signals become digital received signals 300 through digital conversion. During the training signal period of a received burst signal, an initial weight vector computing unit 120 computes initial weight vector signals 362 based on an adaptive algorithm. The measuring unit 200 measures the powers of the digital received signals 300 and selects a digital received signal 300 with the largest electric power as the representative signal. At the end of a training signal period, the measuring unit 200 calculates the phase errors of the weight vectors, of the initial weight vector signals 362, to be processed against the representative initial weight vector, and stores the results as initial phase errors. The initial values of receiving weight vector signals 312 are set in the initial weight vector signals 362.

After the end of a training signal period, the phase errors of the signals to be processed against the representative signal, of the multiplication signals 350 which are receiving weight vector signals 312 and digital received signals 300 multiplied together, are computed respectively. Further, the values of initial phase errors are removed from the values of computed phase errors, and receiving weight vector signals 312 are updated by the values after the removal. An adder 64 outputs a composite signal 304 in which multiplication signals 350 are synthesized.

According to the first embodiment of the present invention, the phase errors between signals received by a plurality of antennas, which have been determined when receiving the known signals, may be retained even when the frequency oscillators provided respectively for a plurality of antennas have frequency offsets. Moreover, even where the known signals are not received, the amplitude of the signals synthesizing a plurality of signals can be retained by using the phase errors obtained when the known signals are being received. Moreover, the present embodiment can make the error small because the signal to serve as a representative in deriving the phase errors is a signal with the largest received power of all the signals received by a plurality of antennas. Moreover, the amount of processing is made smaller since it is only necessary to retain the phase errors relative to the representative signal.

Second Embodiment

A second embodiment of the present invention, similar to the first embodiment, relates to a base station apparatus provided with a plurality of antennas and a plurality of frequency oscillators corresponding thereto. In the second embodiment, however, adaptive array antenna processing is not carried out as in the first embodiment, but signals received by the plurality of antennas are subjected to a diversity processing such as equal gain combining or maximal ratio combining.

Figure 10:
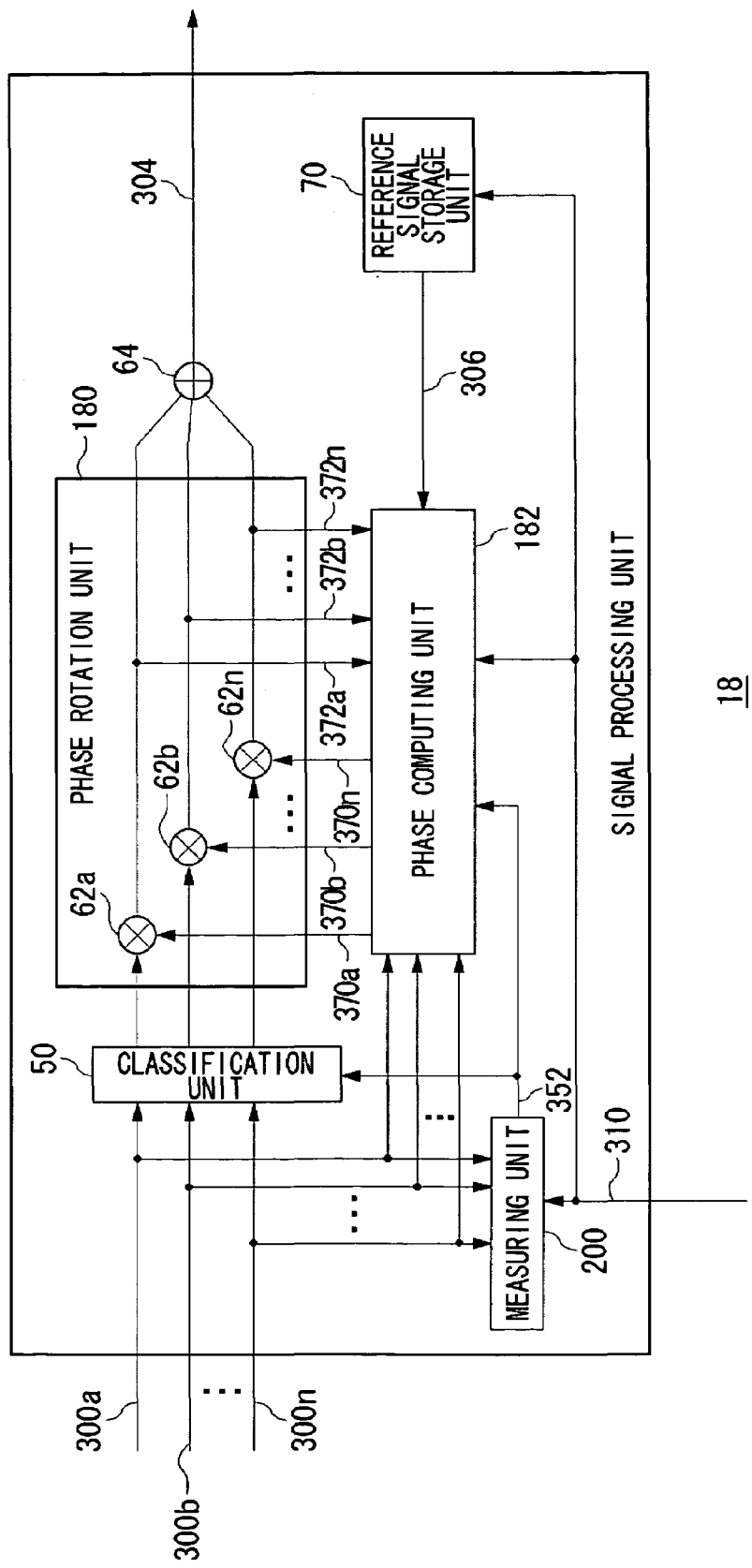
FIG. 10 shows a structure of a signal processing unit according to a second embodiment of the present invention.

FIG. 10 illustrates a structure of a signal processing unit 18 according to a second embodiment. The signal processing unit 18 shown in FIG. 10 corresponds to the receiving function of the signal processing unit 18 of FIG. 4 and includes a phase rotation unit 180 and a phase computing unit 182. The signals involved include a first phase rotation signal 370a, a second phase rotation signal 370b ... and an Nth phase rotation signal 370n, which are generically referred to as phase rotation signals 370, and a first multiplication signal 372a, a second multiplication signal 372b ... and an Nth multiplication signal 372n, which are generically referred to as multiplication signals 372. The components of the signal processing unit 18 shown in FIG. 10 having the same reference numerals as those for the components of the signal processing unit 18 of FIG. 4 perform the same functions, and therefore their repeated explanation is omitted.

During a training signal period, the phase computing unit 182 computes the phase rotation signals 370 necessary for the phase rotation of digital received signals 300 from the digital received signals 300 and reference signal 306. On the other hand, after the end of a training signal period, the phase rotation signals 370 are updated based on the multiplication signals 372 to be described later. The details thereof will be described later.

The phase rotation unit 180 performs the phase rotation of the digital received signals 300 by the phase rotation signals 370 and outputs the multiplication signals 372.

Figure 11:
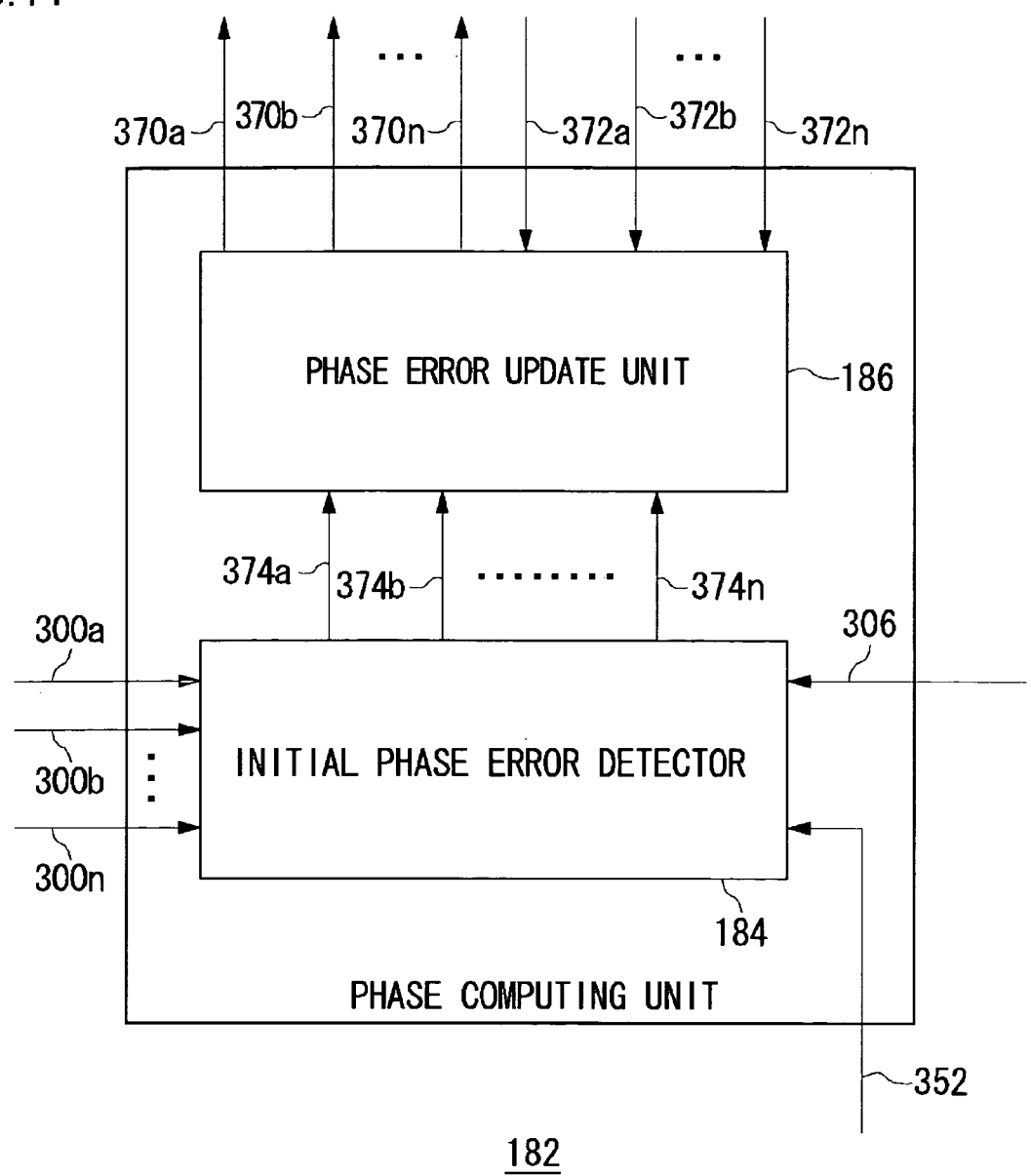
FIG. 11 shows a structure of a phase computing unit shown in FIG. 10.

FIG. 11 illustrates a structure of a phase computing unit 182. The phase computing unit 182 includes an initial phase error detector 184 and a phase error update unit 186. The signals involved include a first initial phase error signal 374a, a second initial phase error signal 374b ... and an Nth initial phase error signal 374n, which are generically referred to as initial phase error signals 374.

During a training signal period, the initial phase error detector 184 detects the respective phases of digital received signals 300 based on a reference signal 306. One example of detection method is inverse modulation. Further, at the end of a training signal period, initial phase error signals 374 are classified into one corresponding to the representative signal and ones to be processed, based on a representative notifying signal 352, and the initial phase error signal 374 corresponding to the representative signal is outputted as a first initial phase error signal 374a.

The phase error update unit 186 uses the initial phase error signals 374 as initial values and updates the phase rotation signals 370 based on the multiplication signals 372. The structure of the phase error update unit 186, which is basically the same as a receiving weight vector update unit 114 of FIG. 7, does not include the initial error detector 126 thereof. That is, control by the phase error update unit 186 is done in a manner such that all the multiplication signals 372 are synchronized to the same phase.

Figure 12:
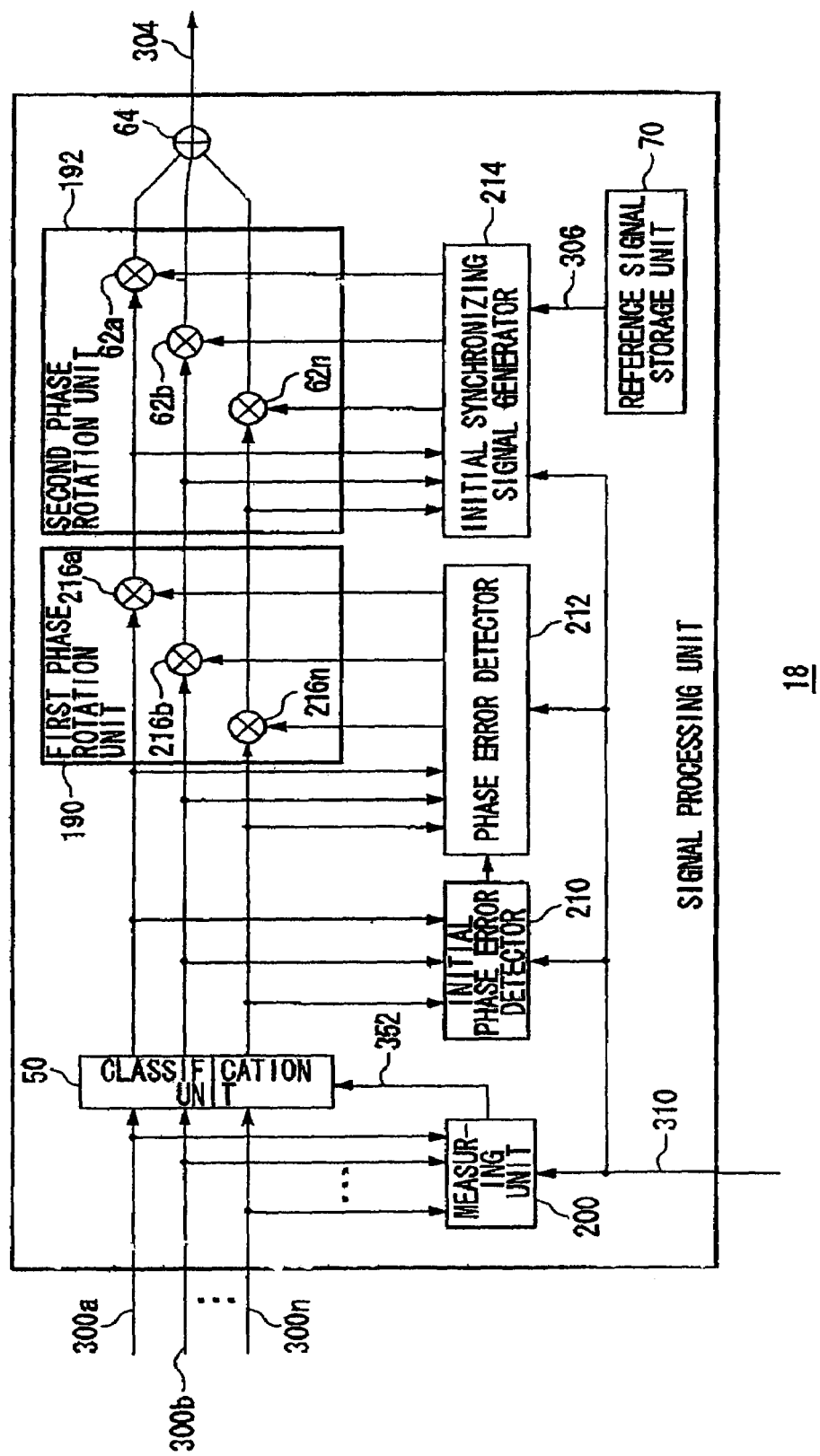
FIG. 12 shows another structure of a signal processing unit according to the second embodiment of the present invention.

FIG. 12 illustrates another structure of a signal 25 processing unit 18 according to the second embodiment. The signal processing unit 18 includes a classification unit 50, a first multiplier 216a, a second multiplier 216b ... and an Nth multiplier 216n, which are grouped in a first phase rotation unit 190 and genetically referred to as multipliers 216, a second phase rotation unit 192, an adder 64, a measuring unit 200, an initial phase error detector 210, a phase error detector 212, an initial synchronizing signal detector 214 and a reference signal storage unit 70. The signals involved include a first digital received signal 300a, a second digital received signal 300b ... and an Nth digital received signal 300n, which are genetically referred to as digital receives signals 300, a composite signal 304, a reference signal 306 and a signal processor control signal 310.

During a training signal period, the measuring unit 200 measures the respective received powers of digital received signals 300 and selects as a representative signal one of the digital receiving signals 300 whose received power is the highest. Also, as previously described, the digital received signals other than the representative signal are determined to be the signals to be processed. Information on the selected representative signal is outputted as a representative notifying signal 352. Here, a training signal period is recognized by a signal processor control signal 310.

The classifying unit 50 changes the order of digital received signals 300 based on the representative notifying signal 352 after the end of a training signal period. That is, a representative signal is inputted to a first multiplier 62a of multipliers 62 described later. During a training signal period, on the other hand, it is not necessary that the order of inputted digital received signals 300 be changed, or the order of the digital received signals 300 may be changed according to the representative notifying signal 352 at the previous burst signal.

The initial phase error detector 210 calculates the respective phase errors of digital received signals 300 to be processed against the representative signal during a training signal period and determines them to be the initial phase errors before the training signal period comes to the end. After the end of the training signal period, the initial phase error detector 210 does not operate but retains the initial phase errors and outputs them to the phase error detector 212.

The phase error detector 212 calculates the phase errors, one by one, of digital received signals 300 to be processed against the representative signal after the end of a training signal period and removes the respective initial phase error components from the calculated phase errors. The multipliers 216 multiply together the digital received signals 300 and the phase errors from which the initial phase error components have been removed. As a result, the phase relations between the digital received signals 300 retain the status during a training period even after the end of the training period.

The initial synchronizing signal detector 214 generates a signal for synchronizing the phases among digital received signals 300, from digital received signals 300 and a reference signal 306 during a training signal period. This signal may be generated by an inverse modulation technique, for instance. After the end of a training signal period, the output signals of the multipliers 216 are subjected to a phase rotation using the signals generated by the multipliers 62, and these are added by the adder 64 so as to output a composite signal 304.

The reference signal storage unit 70 outputs a known training signal, which has been stored beforehand during a training signal period, as a reference signal 306.

A synthesizing unit 60 generates multiplication signals 350 by weighting digital received signals 300 with receiving weight vector signals 312 in the multipliers 62 and then adds the thus generated multiplication signals 350 in the adder 64 to output a composite signal 304.

According to the second embodiment of the present invention, a signal can be synthesized by synchronizing the phases among the signals received by a plurality of antennas even when the frequency oscillators provided for the plurality of antennas have frequency offsets. Moreover, the errors can be made smaller because the signal to be used as a representative for obtaining phase errors is one with the largest received power of the signals received by a plurality of antennas. Moreover, the amount of processing is also small because it is only necessary to retain the phase errors in relation to the representative signal.

The present invention has been described based on the embodiments which are only exemplary. It is therefore understood by those skilled in the art that there exist other various modifications to the combination of each component and process described above and that such modifications are also encompassed by the scope of the present invention.

In the first and second embodiments, the receiving weight vector computing unit 68 uses an adaptive algorithm to estimate receiving weight vector signals 312. However, any other processings may be carried out in the receiving weight vector computing unit 68. For example, the receiving weight vector computing unit 68 may determine a receiving weight vector signal 312 by carrying out a processing of correlation to known signals. Moreover, an arrival direction estimation using an algorithm, such as MUSIC (MUltiple SIgnal Classification), which is different from the adaptive algorithm or correlation processing, may be executed. This modified example may realize a more detailed distinction between desired waves and undesired waves. Thus, the modified example or other modifications may also be acceptable as long as they can estimate values by which a plurality of received signals can be separated in the signal processing with an adaptive array antenna.

In the first and second embodiments, the communication system 100 is applied to a CSMA-based communication system 100. However, the base station apparatus 34 may be applied to communication systems other than the CSMA-based one and, such other multiple access technology to be applied thereto includes, for example, TDMA (Time Division Multiple Access), CDMA (Code Division Multiple Access) and SDMA (Space Division Multiple Access). According to this modified example, the present invention can be applied to various types of communication systems. That is, it is acceptable so long as the base station apparatus 34 is one that receives signals from terminal apparatuses.

In the first embodiment of the present invention, the initial detector 118 calculates the errors among the initial weight vector signals 362 at the end of a training signal period as the initial phase errors. However, the timing at which the errors are calculated is not limited thereto and, for example, the initial detector 118 may calculate the errors among the initial weight vector signals 362 at an arbitrary point during a training signal period as the initial phase errors. According to this modified example, the timing of the processing may be moved forward, so that the memory capacity needed to delay the predetermined signals may be made smaller. In other words, so long as accurate values can be obtained for the initial phase errors, the timing for obtaining them may be before or after the end of a training signal period.

In the second embodiment of the present invention, the signal processing unit 18 performs a diversity of equal gain combining. However, the mode of diversity is not limited thereto and, for example, it may be the maximal ratio combining. In this case, a weighting unit, which carries out the weighting according to the power ratio among the digital received signals 300, is to be added in the front stage of the adder 64. According to this modified example, the error rate of the signals received can be improved. That is, this can be used in the application where a signal is synthesized by synchronizing the phases among a plurality of signals.

Although the present invention has been described by way of exemplary embodiments, it should be understood that many changes and substitutions may further be made by those skilled in the art without departing from the scope of the present invention which is defined by the appended claims.

What is claimed is:

1. A receiving apparatus, comprising:
a receiver which respectively receives a plurality of signals that contain known signals continuously within a predetermined period, via a plurality of antennas;
a signal generator which respectively generates a plurality of phase rotation signals for synchronizing the phase of the plurality of signals received by said receiver, at least over the period that contains known signals;
a phase rotation unit which rotates the phase of the plurality of received signals by the plurality of phase rotation signals generated by said signal generator;
a classification unit which changes the order of the plurality of received signals and selects one of the plurality of phase rotated signals as a representative signal, and which changes the order of the plurality of received signals and selects the remaining phase rotated signals as signals to be processed;
an error detector which respectively detects errors in phase components of the signals to be processed relative to a phase component of the representative signal, after the end of the period that contains the known signals; and
an update unit which respectively updates the phase rotated signals corresponding to the signals to be processed, based on the errors in phase components detected by said error detector.

2. A receiving apparatus, comprising:
a receiver which respectively receives a plurality of signals that contain known signals continuously within a predetermined period, via a plurality of antennas;
a classification unit which changes the order of the plurality of signals and selects one of the plurality of phase rotated signals as a representative signal, and which changes the order of the plurality of received signals and selects the remaining phase rotated signals as signals to be processed;
an initial detector which respectively detects errors in phase components of the signals to be processed relative to a phase component of the representative signal, as initial phase errors, within the period containing known signals;
an error detector which respectively detects errors in phase components of the signals to be processed relative to a phase component of the representative signal, after the end of the period containing known signals, and which removes corresponding initial phase errors from the errors in phase components;
a first phase rotation unit which respectively rotates the phase of the plurality of the signals to be processed by errors in phase component from which the initial phase error has been removed;
an initial synchronizing signal generator which respectively generates a plurality of phase rotation signals for synchronizing the phase of the plurality of signals received by said receiver, at least over the period that contains known signals; and
a second phase rotation unit which respectively rotates the phase of a plurality of signals that contain the representative signal and the phase-rotated signals to be processed, by the plurality of phase rotation signal generated by said signal generator.

3. A receiving apparatus according to claim 1, further comprising a synthesizing unit which synthesizes the plurality of signals which are phase-rotated by said phase rotation unit.

4. A receiving apparatus according to claim 2, further comprising an adder which synthesizes the plurality of signals which are phase-rotated by said second phase rotation unit.

5. A receiving apparatus, comprising:
a receiver which respectively receives a plurality of signals that contain known signals continuously within a predetermined period, via a plurality of antennas;
a derivation unit which derives a plurality of receiving weight factors for the plurality of signal received by said receiver at least over the period that contains known signals;
a synthesizing unit which multiplies the plurality of derived receiving weight factors by the plurality of signals received by said receiver and which synthesizes a plurality of multiplication results;
a classification unit which changes the order of the plurality of multiplication results and selects one of the plurality of multiplication results as a representative signal, and which changes the order of the plurality of multiplication results and selects the remaining multiplication results as signals to be processed;
an initial detector which respectively detects errors in phase components of the signals to be processed relative to a phase component of the representative signal, as initial phase errors, in the period that contain known signals;
an error detector which respectively detects errors in phase components of the signals to be processed relative to a phase component of the representative signal, after the end of the period that contains the known signals and which removes corresponding initial phase errors from the errors in phase components; and
an update unit which respectively updates the receiving weight factors corresponding to the signals to be processed, by the errors in phase components from which the initial phase error has been removed.

6. A receiving apparatus according to claim 5, wherein said receiver receives respectively the plurality of signals, based on a plurality of local signals outputted respectively from a plurality of signal generators.

7. A receiving apparatus according to claim 5, further comprising a measuring unit which measures the strength of the plurality of signals received by said receiver, wherein according to the strength of the plurality of signals said classification unit selects one of the plurality of multiplication results as a representative signal.

8. A receiving apparatus according to claim 6, further comprising a measuring unit which measures the strength of the plurality of signals received by said receiver, wherein according to the measured strength of the plurality of signals said classification unit selects one of the plurality of multiplication results as a representative signal.

9. A receiving method, comprising:
receiving respectively a plurality of signals that contain known signals continuously within a predetermined period and generating respectively a plurality of phase rotation signals for synchronizing the phase of the plurality of received signals, at least over the period that contains known signals;
rotating the phase of the plurality of received signals by the plurality of phase rotation signals generated by said generating, changing the order of the plurality of phase rotation results and selecting one of the plurality of phase rotation results as a representative signal, and changing the order of the plurality of phase rotation results and selecting the remaining phase rotation results as signals to be processed; and updating respectively the phase rotated signals corresponding to the signals to be processed, based on the errors in phase components of the signals to be processed relative to a phase component of the selected representative signal, after the end of the period containing known signals.

10. A receiving method according to claim 9, further comprising synthesizing results on the plurality of phase rotated signals so as to output synthesized signals.

11. A receiving method, comprising:

receiving respectively a plurality of signals that contain known signals continuously within a predetermined period and deriving a plurality of receiving weight factors for the plurality of received signal at least over the period that contains known signals;

multiplying the plurality of derived receiving weight factors by the plurality of received signals, changing the order of the plurality of multiplication results and selecting one of the plurality of multiplication results as a representative signal, and changing the order of the plurality of multiplication results and selecting the remaining multiplication results as signals to be processed;

detecting respectively errors in phase components of the signals to be processed relative to a phase component of the representative signal, as initial phase errors, within the period that contains known signals; and updating respectively the receiving weight factors corresponding to the signals to be processed, by signals from which the initial phase errors are respectively removed from the detected errors in phase components of the signals to be processed relative to a phase component of the representative signal, after the end of the period that contains known signals.

12. A receiving method according to claim 11, wherein said deriving a plurality of receiving weight factors is such that the plurality of signals are received respectively based on a plurality of local signals outputted respectively from a plurality of signal generators.

13. A receiving method according to claim 11, further comprising measuring the strength of the plurality of received signals, wherein said selecting a representative signal selects one of the plurality of multiplication results as a representative signal according to the measured strength of the plurality of received signals.

14. A recording medium which stores a program executable by a computer, the program including the functions of:

receiving respectively a plurality of signals that contain known signals continuously within a predetermined period, via a plurality of antennas;

generating respectively a plurality of phase rotation signals for synchronizing the phase of the plurality of received signals, at least over the period that contains known signals and storing the thus generated plurality of phase rotation signals in a memory;

rotating the phase of the plurality of received signals by the plurality of phase rotation signals generated by said generating;

changing the order of the plurality of phase rotated signals and selecting one of the plurality of phase rotated signals as a representative signal, and changing the order of the plurality of phase rotated signals and selecting the remaining phase rotated signals as signals to be processed;

detecting respectively errors in phase components of the signals to be processed relative to a phase component of the representative signal, after the end of the period containing known signals; and updating respectively on the memory the phase rotated signals corresponding to the signals to be processed, based on the detected errors in phase components.

15. A recording medium according to claim 14, the functions thereof further comprising synthesizing the plurality of phase rotated signals so as to output synthesized signals.

16. A recording medium which stores a program executable by a computer, the program including the functions of:

receiving respectively a plurality of signals that contain known signals continuously within a predetermined period, via a plurality of antennas;

deriving a plurality of receiving weight factors for the plurality of received signal at least over the period that contains known signals, and storing the thus derived plurality of receiving weight factors in a memory;

multiplying the plurality of receiving weight factors stored in the memory by the plurality of received signals and synthesizing a plurality of multiplication results;

changing the order of the plurality of multiplication results and selecting one of the plurality of multiplication results as a representative signal, and changing the order of the plurality of multiplication results and selecting the remaining multiplication results as signals to be processed;

detecting respectively errors in phase components of the signals to be processed relative to a phase component of the representative signal, as initial phase errors, within the period that contains known signals;

detecting respectively errors in phase components of the signals to be processed relative to a phase component of the representative signal, after the end of the period that contains the known signals, and removing corresponding initial phase errors from the errors in phase components; and updating respectively on the memory the receiving weight factors corresponding to the signals to be processed, by the errors in phase components from which the initial phase errors have been removed.

17. A recording medium according to claim 16, wherein said receiving is such that the plurality of signals are received respectively based on a plurality of local signals outputted respectively from a plurality of signal generators.

18. A recording medium according to claim 16, the functions thereof further comprising measuring the strength of the plurality of received signals, wherein said selecting a representative signal selects one of the plurality of multiplication results as a representative signal according to the measured strength of the plurality of received signals.

* * * * *